I. T. FERGUSON.
CULTIVATOR.
APPLICATION FILED SEPT. 5, 1914.
1,143,524.
Patented June 15, 1915.
2 SHEETS—SHEET 2.
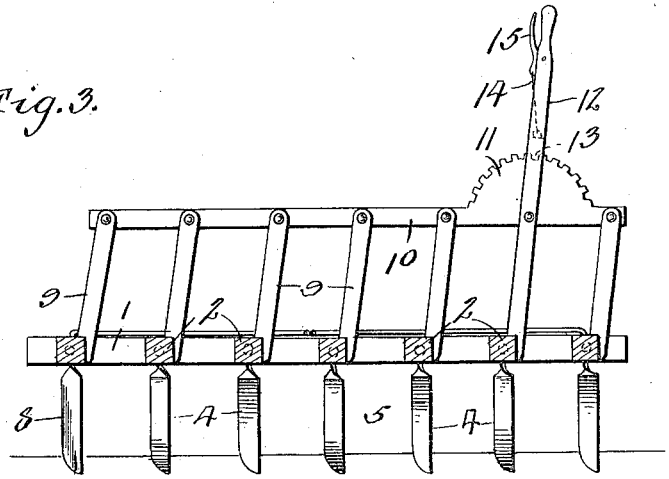
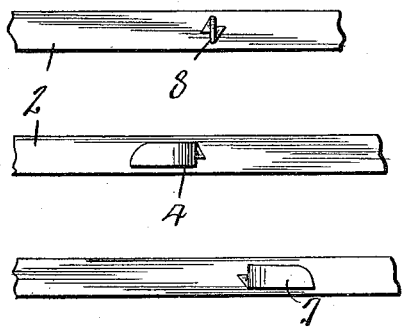
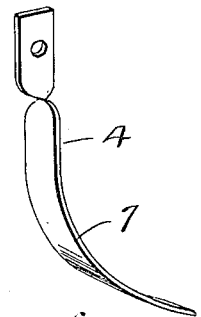
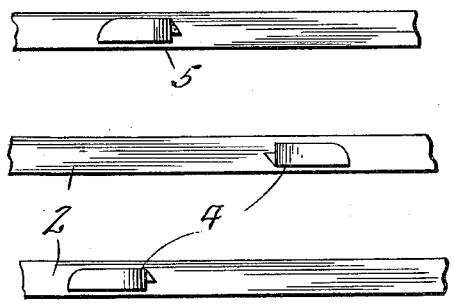
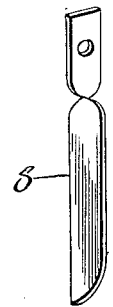
Inventor
I. T. Ferguson,
By Victor J. Evans
Attorney
Witnesses

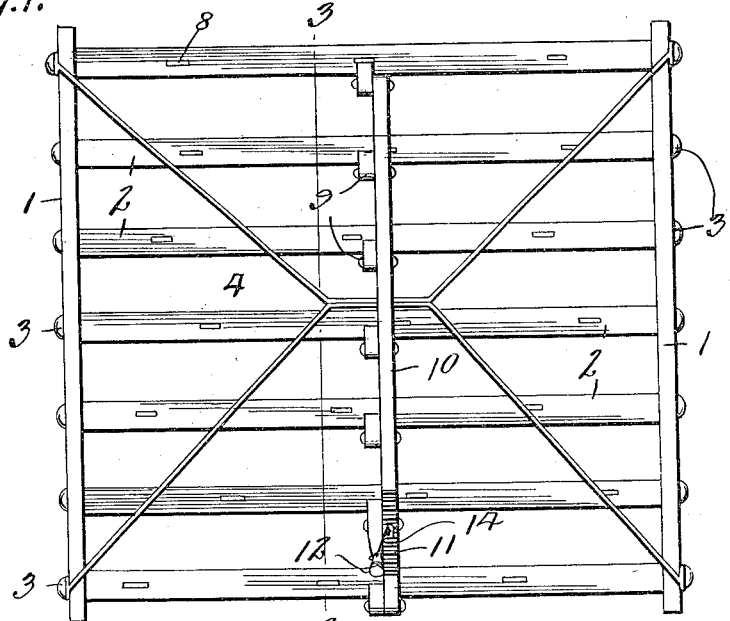
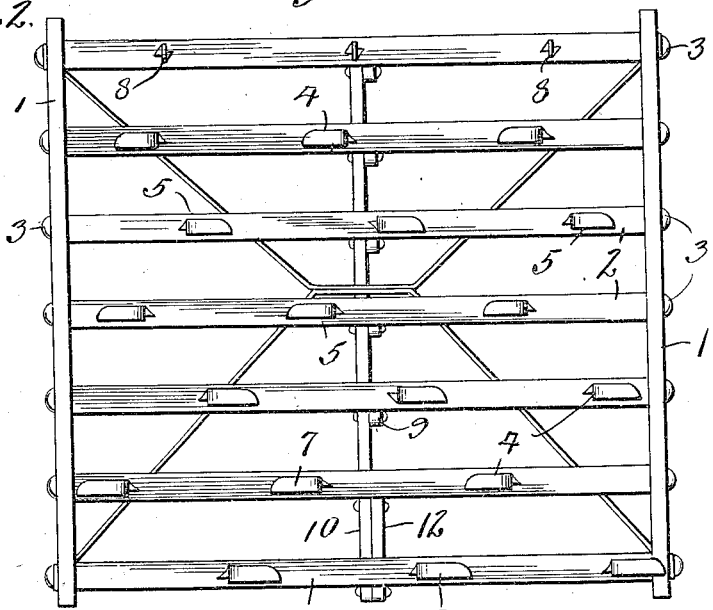

UNITED STATES PATENT OFFICE.

ISAAC T. FERGUSON, OF TIPTONVILLE, TENNESSEE.

CULTIVATOR.

1,143,524.    Specification of Letters Patent.    Patented June 15, 1915.

Application filed September 5, 1914. Serial No. 860,498.

*To all whom it may concern:*

Be it known that I, ISAAC T. FERGUSON, a citizen of the United States, residing at Tiptonville, in the county of Lake and State of Tennessee, have invented new and useful Improvements in Cultivators, of which the following is a specification.

This invention relates to improvements in cultivators and has particular application to a machine for turning furrows.

In carrying out the present invention, it is my purpose to provide a machine of the class described whereby furrows may be turned and the dirt thrown into rows at the sides of the furrows and wherein the teeth or blades may be adjusted angularly with respect to the ground so that the depth that the blades enter the ground may be regulated or controlled.

It is also my purpose to provide a machine of the type set forth wherein the blades may be adjusted quickly and conveniently and held in the desired adjusted position.

With the above and other objects in view, the invention consists in the construction, combination and arrangement of parts hereinafter set forth in and falling within the scope of the claims.

In the accompanying drawings: Figure 1 is a top plan view of a cultivator machine constructed in accordance with the present invention. Fig. 2 is a bottom plan view thereof. Fig. 3 is a sectional view on the line 3—3 of Fig. 1. Fig. 4 is an enlarged fragmentary bottom plan view showing the arrangement of one set of teeth. Fig. 5 is a perspective view of one of the teeth. Fig. 6 is a similar view of the head tooth.

Referring now to the drawings in detail, 1, 1 designate side bars spaced apart and lying parallel with each other, while 2 indicates supporting bars arranged transversely of the side bars between the latter and having the opposite ends thereof secured to the side bars through the medium of pivot studs 3 whereby the supporting bars may be rotated relatively to the side bars, the supporting bars being spaced apart equal distances and disposed parallel with one another.

Secured to the supporting bars 2 and depending therefrom are teeth 4 arranged in sets 5 each embodying two rows of teeth, the teeth of one row being secured to alternate bars and the teeth of the other row to the remaining bars. The teeth of each row diverging outwardly from the teeth of the adjacent row and each tooth curved longitudinally as at 7 and the outer ends of the teeth of each row diverge outwardly from the similar ends of the teeth of the companion row, while fastened to the forward supporting bar and depending therefrom are head teeth 8, each disposed at the head of one of the sets 5 and arranged between the rows of such set.

In practice, the frame formed by the side bars 1 and supporting bars 2 is drawn along over the ground and the teeth 4 of the sets 5 form furrows, while the dirt from the furrows is thrown up between the teeth of the adjacent sets so as to form the rows or ridges, the dirt being so thrown owing to the longitudinal curvature of the teeth. In the movement of the cultivator over the ground, the head teeth open the furrow, while the following teeth enter the furrow in such manner as to gradually widen the same and throw the dirt upwardly at the sides of the furrow.

In order that the supporting bars 2 may be swung upon the studs simultaneously so that the teeth may be disposed in different angular positions with respect to the ground, any suitable means may be employed. In the present instance, an arm 9 is fastened to each supporting bar 2 and projects upwardly therefrom and interconnecting the upper ends of the arms 9 and pivotally connected thereto is a main actuating bar 10. Formed on the upper edge of the actuating bar 10 adjacent to one end thereof is a toothed segment 11, while formed on the upper end of the adjacent arm 9 and projecting upwardly therefrom is a handle 12 provided with a locking dog 13 designed to engage the teeth of the segment 11 and connected with a releasing rod 14 under the control of a hand piece 15. By means of this construction, it will be seen that when the hand piece 15 is operated to slide the rod 12 and disengage the dog 13 from the teeth of the segment 11, the handle 12 may be swung in one direction or the other whereby the arms 9 will be simultaneously swung through the medium of the bar 10, thereby swinging the supporting bars 2 to lower or elevate the teeth 4, according to the direction of movement of the handle 12.

From the foregoing description taken in connection with the accompanying drawings, the construction, mode of operation and manner of employing my invention will be readily apparent. It will be seen that I have provided a cultivator whereby furrows may be opened and the dirt thrown out of such furrows at the sides of the latter to form rows.

I claim:

1. In a cultivator, a plurality of supporting bars spaced apart in parallelism, teeth secured to said bars and depending therefrom and arranged in sets, each embodying two rows of teeth, the teeth of one row being secured to alternate bars and the teeth of the other row secured to the remaining bars, the teeth of each row diverging outwardly from the teeth of the remaining row, and a head tooth at the forward end of each set between the rows thereof.

2. In a cultivator, a plurality of supporting bars spaced apart in parallelism, teeth secured to said bars and depending therefrom and arranged in sets, each embodying two rows of teeth, the teeth of one row being secured to alternate bars and the teeth of the other row secured to the remaining bars, the teeth of each row diverging outwardly from the teeth of the remaining row, and a head tooth at the forward end of each set between the rows thereof, each of said first teeth being curved longitudinally and having the outer end thereof diverging outwardly from the companion tooth in the adjacent row.

3. In a cultivator, a plurality of supporting bars spaced apart in parallelism, teeth secured to said bars and depending therefrom and arranged in sets, each embodying two rows of teeth, the teeth of one row being secured to alternate bars and the teeth of the other row secured to the remaining bars, the teeth of each row diverging outwardly from the teeth of the remaining row, a head tooth at the forward end of each set between the rows thereof, each of said first teeth being curved longitudinally and having the outer end thereof diverging outwardly from the companion tooth in the adjacent row, and means for swinging said supporting bars whereby the angular positions of said teeth with respect to the ground may be changed.

In testimony whereof I affix my signature in presence of two witnesses.

I. T. FERGUSON.

Witnesses:
R. H. BRIGANCE,
B. F. LE DUKE.

Copies of this patent may be obtained for five cents each, by addressing the "Commissioner of Patents, Washington, D. C."